A. KAUFMANN & A. GOLDENBERG.
FOLDING BABY CARRIAGE.
APPLICATION FILED APR. 9, 1908.
919,880.
Patented Apr. 27, 1909.
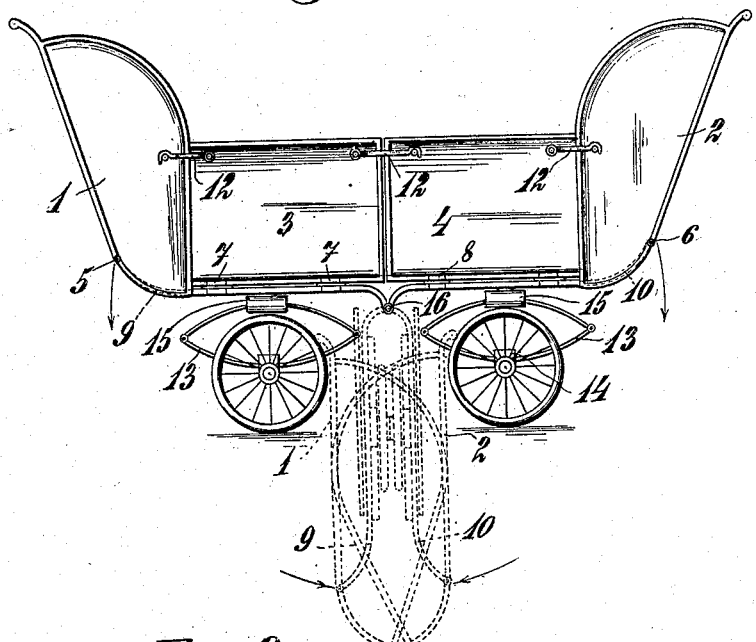
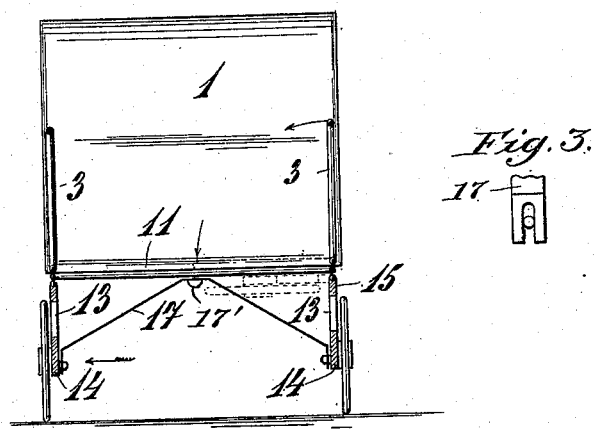

UNITED STATES PATENT OFFICE.

ADOLF KAUFMANN AND ADOLF GOLDENBERG, OF BUCAREST, ROUMANIA.

FOLDING BABY-CARRIAGE.

No. 919,880.

Specification of Letters Patent.

Patented April 27, 1909.

Application filed April 9, 1908. Serial No. 426,071.

*To all whom it may concern:*

Be it known that we, ADOLF KAUFMANN, corn merchant, and ADOLF GOLDENBERG, dentist, both residing at Strada Sf. Niculæ Selari 2, Bucarest, Roumania, both subjects of the King of Roumania, have invented new and useful Improvements in Folding Baby-Carriages, of which the following is a full and clear specification, reference being had to the accompanying drawing.

The invention relates to baby-carriages which are adapted to be folded together and the object of the invention is to provide a folding baby-carriage with a carriage-body the front walls as well as the lateral walls of which may be turned down upon the bottom of the wagon-body, whereas they are kept in their upright position by means of suitable locking means; and a further object of the invention is to provide the baby-carriage with wheels which are independent from each other and carried by pivotally arranged springs, in order to permit of turning each wheel upon the downward surface fo the bottom part of the carriage-body.

In the accompanying drawing the invention is shown by way of example, Figure 1 being a side elevation of a baby-carriage as ready for use; the dotted lines show the carriage folded together. Fig. 2 is a front elevation with one wheel shown by dotted lines in collapsed position. Fig. 3, is a detail view looking in the direction of the arrow shown in Fig. 2.

The body of the carriage consists of a framing which is divided into several parts and provided with suitable panels of leather or the like. The front frame parts 1 and 2 are hinged at 5 and 6 to the parts 9 and 10 and the lateral wagon-body parts 3 and 4 are hinged respectively to the S-shaped frame rods 9 and 10. Thereby the walls of the wagon-body may be turned upon the bottom part 11 of the wagon-body, whereas they are locked in their upright position by any suitable means, for instance by catches 12.

The wheels have no common axle. The spring 13 arranged between each axle-bearing 14 and the bottom part 11 of the wagon body is connected with the framing by means of a horizontal hinge 15 in such a way that it may be turned with its respective wheel upon the downward face of the bottom part 11 only, while the hinge 15 permits of no outwardly directed movement of the wheel.

The bottom frame rods 9, 10 are also pivotally connected with each other at 16 Fig. 1 and therefore may be brought into the position shown in Fig. 1 by dotted lines, where the wheels occupy the empty space left between the S-shaped rods 9 and 10.

The bottom part of the carriage-body carries two springs 17, pivoted at 17' so as to be swung at right angles when the carriage is folded. The springs 17 are provided with vertical slots shown in the drawing in their ends, in each of which an axle of one wheel enters, whereby the wheels are kept in their running position and their lateral movement is checked, but at the same time the slots permit the carriage-body of freely moving in vertical direction.

Having now perfectly described our invention, what we claim as new and ask to secure by Letters Patent is:

1. A folding baby-carriage with springs hinged to the carriage framing each one of said springs carrying a wheel, and the axles of said wheels arranged each one in a vertical slot provided in the ends of other springs, each one of the slotted springs appertaining to one pair of wheels and secured to the carriage bottom, substantially as described.

2. A folding perambulator comprising in combination, a two part frame, said parts being hinged directly to each other to fold with their bottom portions facing inwardly and their upper portions facing outwardly, wheels hinged to said frame parts to fold inwardly and lie between said bottom portions and in alined relation with respect to each other when folded, side members hinged to each frame part and foldable downwardly upon the upper portions thereof, and an end member hinged to each frame part to fold downwardly on said side members.

3. A folding perambulator comprising in combination, a two part frame, said parts being hinged directly to each other to fold with their bottom portions facing inwardly and spaced apart from each other in their folded position and with their upper portions facing outwardly, wheels hinged to said frame parts to fold inwardly and lie between said bottom portions, two side members for each frame part hinged to fold downwardly upon the upper portions thereof, and an end member hinged to each frame part to fold downwardly on said side members.

4. A folding perambulator comprising in combination, a folding body portion, wheels hinged to said body portion and provided with projecting axles, and springs connected with said body portion and provided with slotted terminals engaging said axles to retain said wheels in a running position and permit yielding movement of said body with respect to said wheels.

In testimony whereof we have subscribed this in the presence of two witnesses.

ADOLF KAUFMANN.
A. GOLDENBERG.

Witnesses:
JAMES BERNSTEIN,
OTTO TEBER.